United States Patent Office 3,584,049
Patented June 8, 1971

3,584,049
ALIPHATIC ARYL IMINES AND THEIR PREPARATION
Josef Schmitt, L'Hay-les-Roses, and Marcel D. P. Brunaud, Paris, France, assignors to Etablissements Clin-Byla, Paris, France
No Drawing. Filed Apr. 15, 1968, Ser. No. 721,164
Claims priority, application France, Apr. 21, 1967, 103,676
Int. Cl. C07c 119/00
U.S. Cl. 260—566F                                                      1 Claim

ABSTRACT OF THE DISCLOSURE

Arylethylamines, such as amphetamine, form with trialkoxybenzaldehydes having 1 to 4 carbon atoms in each alkoxy group, Schiff's bases having the formula

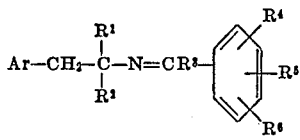

in which Ar is a substituted or unsubstituted aryl group, $R^1$ is a hydrogen atom or a methyl group, $R^2$ is a hydrogen atom or an alkyl group having 1 to 3 carbon atoms, $R^3$ is a hydrogen atom or an alkyl group having 1 to 4 carbon atoms but is a hydrogen atom when $R^1$ is a methyl group and $R^2$ is an alkyl group, and each of $R^4$, $R^5$ and $R^6$ is an alkoxy group having 1 to 4 carbon atoms. Anorexigenic studies undertaken with the Schiff's bases are described.

---

This invention relates to Schiff's bases and to the production thereof.

We have found that the Schiff's bases which are obtained by the condensation of a biologically active primary amine, more especially a sympathomimetic amine, with (trialkoxyphenyl) alkyl ketones or with trialkoxybenzaldehydes, have the characteristic, contrary to what is normally observed in Schiff's bases, of being relatively resistant to hydrolysis even in the presence of a strong mineral acid.

However, the body is capable after administration of these products, of liberating the amines from which they are derived in physiological media. These findings render such products particularly useful for obtaining a delayed action from the corresponding amines. Moreover, the Schiff's bases are generally less toxic than the amines and enable the active dose to be reduced due to the progressive liberation of the product in the body.

The present invention provides a Schiff's base having the general formula

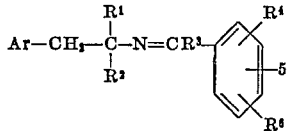

in which Ar represents an unsubstituted aryl group or an aryl group having one or more halogen atoms, hydroxyl groups or alkoxy groups as substituents, $R^1$ is a hydrogen atom or a methyl group, $R^2$ is a hydrogen atom or an alkyl group having one to three carbon atoms, $R^3$ is a hydrogen atom or an alkyl group having one to four carbon atoms but is a hydrogen atom when $R^1$ is a methyl group and $R^2$ is an alkyl group and each of $R^4$, $R^5$ and $R^6$ is an alkoxy group having 1 to 4 carbon atoms. The aryl group Ar is preferably a monocyclic aryl group, e.g. a phenyl group.

The products having the above general formula may be prepared according to the invention by condensing an arylethylamine having the general formula

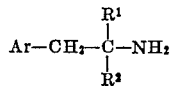

in which Ar, $R^1$ and $R^2$ are as above defined, with a trialkoxybenzaldehyde or with a trialkoxyphenyl alkyl ketone.

If condensation takes place readily, it may be carried out at room temperature in a diluent such as ethanol, from which the reaction product crystallises directly. If the condensation proceeds less readily, in particular if a trialkoxyphenyl alkyl ketone is used, it is carried out under reflux in the presence of an aromatic hydrocarbon such as benzene, toluene or xylene. In this case it is generally advantageous to add a small quantity of a dehydrating agent such as anhydrous zinc chloride. The water formed in the course of the reaction is removed as it is formed, since it is removed as an azeotropic mixture with the aromatic hydrocarbon. The progress of the reaction may be determined by measuring the quantity of water collected.

At the end of the reaction, the reaction mixture may, if required, be treated at room temperature with a dilute solution of soda to decompose the zinc complex formed, and the condensation product may be isolated either by crystallisation or, if it will not crystallise, by distillation.

The trialkoxybenzaldehyde employed may be 2,3,4-trimethoxybenzaldehyde, 2,3,4-triethoxybenzaldehyde, 3,4,5-trimethoxybenzaldehyde, 3,4,5 - triethoxybenzaldehyde or 2,4,6-trimethoxybenzaldehyde.

The trialkoxyphenyl alkyl ketone used may be 3,4,5-trimethoxyacetophenone.

The arylethylamine used in the above process may be amphetamine or 1,1-dimethyl-2-phenylethylamine.

The products have very high thermal stability; they are also very stable in the presence of alkalies. With mineral and organic acids in an anhydrous medium the bases form salts which hydrolyse more or less readily in the presence of water, depending upon the nature of the acid. The presence of two alkyl groups at $R^1$ and $R^2$ is particularly effective in preventing rapid hydrolysis of the imine function.

The infra-red spectra recorded upon a UNICAM SP 200 instrument in solution in methylene chloride all exhibit a band at 1620 to 1640 cm.$^{-1}$ which may be attributed to the presence of the imine group.

The following examples illustrates the preparation of the compounds of the invention. A suffix K indicates that a melting point was determined using a Koefler block.

EXAMPLE 1

4-phenyl-1-(3',4',5'-trimethoxyphenyl) - 1,3 - dimethyl-2-azabutene-1(3942 CB).

27 g. (0.2 mole) of d,1-amphetamine, 21 g. (0.1 mole) of 3,4,5-trimethoxyacetophenone, 50 ml. of toluene and 3 g. of anhydrous zinc chloride are placed into a three-necked flask equipped with a mechanical stirrer, a reflux condenser and a trap for separating water from the condensed vapours.

The reaction mixture is heated to reflux with stirring. Water rapidly separates. 1.8 ml. of water are collected in one hour and the reaction then practically ceases.

After cooling, diethyl ether is added and the solution of the reaction mixture is washed with a dilute soda solution, then with water and the solution dried over anhydrous sodium sulphate. The solvent is evaporated upon a water bath under reduced pressure and the residue then distilled from a retort at very low pressure.

After removal of excess amphetamine, a yellow liquid, B.P.$_{0.05}$ $_{mm}$=180–220° C. (temperature of the heating bath) is obtained. A second distillation carried out under the same conditions yields a yellow oil (29 g.) B.P.$_{0.05}$ $_{mm.}$=180–220° C. (temperature of heating bath). Yield: 88.6%.

EXAMPLE 2 d-4-phenyl - 1-(3',4',5' - trimethoxyphenyl)-3-methyl-2-azabutene-1(4146 CB).

6.7 g. of d-amphetamine, 9.8 g. of 3,4,5-trimethoxybenzaldehyde and 70 ml. of anhydrous benzene are introduced into an apparatus identical with that used in Example 1.

The reaction mixture is heated under reflux with stirring. Water rapidly separates and the reaction is terminated after 45 minutes.

The benzene is evaporated using a water bath under reduced pressure and the residue is then distilled from a retort under very low pressure. A pale yellow liquid (15 g.), B.P.$_{0.05\ mm.}$=185–195° C. (temperature of the bath) is obtained. Yield: 95%. [$\alpha^D$] 23°5=+155° (1% in ethanol).

EXAMPLE 3

4-phenyl - 1-(3',4',5' - trimethoxyphenyl)-3,3-dimethyl-2-azabutene-1 (4143 CB).

A mixture of 98 g. of 3,4,5-trimethoxybenzeldehyde, 78 g. of 1,1-dimethyl-2-phenylethylamine and 15 g. of anhydrous zinc chloride in 500 ml. of anhydrous toluene is heated under reflux with stirring in an apparatus identical with that used in Example 1. Water separates rapidly and the reaction is terminated after two hours and 30 minutes.

After cooling, diethyl ether is added and the resulting solution washed with a dilute soda solution and then with water.

After drying over anhydrous sodium sulphate, the solvents are evaporated on a water bath under reduced pressure; the residue crystallises. The product is recrystallised from ethanol. Yellowish crystals are obtained (145 g.), M.P.$_K$=120° C. Yield: 88.5%.

EXAMPLE 4

4-phenyl - 1-(2',3',4' - trimethoxyphenyl)-3,3-dimethyl-2-azabutene-1 (4444 CB).

The procedure described in Example 1 is repeated, but amphetamine is replaced by an equimolecular quantity of 1,1-dimethyl-2-phenylethylamine and the 3,4,5-trimethoxybenzaldehyde by 2,3,4-trimethoxybenzaldehyde. An orange oil is obtained; B.P.$_{0.05\ mm.}$: 165–175° C. (temperature of heating bath). Yield: 55%.

EXAMPLE 5

4 - phenyl - 1 - (2',4',6' - trimethoxyphenyl) - 3,3-dimethyl-2-azabutene-1.

The procedure described in Example 4 is repeated, but the 2,3,4-trimethoxybenzaldehyde is replaced by 2,4,6-trimethoxybenzaldehyde. The product is obtained in the form of a yellow oil, B.P.$_{0.1\ mm.}$=190–193° C. Yield: 57%.

EXAMPLE 6

4-(4''-chlorophenyl - 1 - (3',4',5'-trimethoxyphenyl)-3,3-dimethyl-2-azabutene-1 (4377 CB).

The procedure described in Example 3 is repeated, but the 1,1-dimethyl-2-phenylethylamine is replaced by the equivalent quantity of 1,1-dimethyl-2-(4'-chlorophenyl)-ethylamine. Slightly yellowish crystals are obtained; M.P.$_K$=126–127° C. (ethanol). Yield: 72%.

EXAMPLE 7

4-(4''-chlorophenyl) - 1 - (2',3',4'-triethoxyphenyl)-3,3-dimethyl-2-azabutene-1 (4445 CB).

The procedure described in Example 3 is repeated, but the 3,4,5-trimethoxybenzaldehyde and 1,1-dimethyl-2-phenylethylamine are respectively replaced by equivalent quantities of 2,3,4-triethoxybenzaldehyde and 1,1-dimethyl-2-(4'-chlorophenyl)ethylamine.

Compound 4445 CB is obtained in the form of colourless crystals. M.P.$_c$=48–49° C. after recrystallisation from light petroleum (B.P. 35–45° C.) cooled to 0° C. Yield: 25%.

EXAMPLE 8

4-(4''-chlorophenyl) - 1 - (3',4',5'-triethoxyphenyl)-3,3-dimethyl-2-azabutene-1 (4559 CB).

The procedure described in Example 3 is repeated, but the 3,4,5-trimethoxybenzaldehyde and 1,1-dimethyl-2-phenyl-ethylamine are respectively replaced by equimolecular quantities of 3,4,5-triethoxybenzaldehyde and 1,1 - dimethyl-2-(4'-chlorophenyl)ethylamine. Colourless crystals, M.P.$_K$=87° C. (hexane) are obtained. Yield: 67%.

EXAMPLE 9

4-(4''-hydroxyphenyl) - 1 - (3',4',5'-trimethoxyphenyl)-2-azabutene-1.

The procedure described in Example 2 is repeated, but the d-amphetamine is replaced by an equimolecular quantity of 2-(4-hydroxyphenyl)ethylamine. Yellow crystals, M.P.$_K$=159° C. (from absolute ethanol) are obtained. Yield: 75%.

EXAMPLE 10

4-phenyl - 1 - (3',4',5' - trimethoxyphenyl)-3,3-dimethyl-2-azabutene-1 (4143 CB).

20 g. of 3,4,5-trimethoxybenzaldehyde and 15 g. of 1,1-dimethyl-2-phenylethylamine are dissolved in 60 ml. of ethanol. Colourless crystals slowly separate upon cooling. These are isolated by suction filtration and washed with a small amount of alcohol; weight 27 g. (yield 81%); M.P.$_K$=120° C.

EXAMPLE 11

4-(4''-chlorophenyl) - 1 - (3',4',5'-trimethoxyphenyl)-3,3-dimethyl-2-azabutene-1 (4377 CB).

The procedure described in Example 10 is repeated, but the 1,1-dimethyl-2-phenylethylamine is replaced by an equimolecular quantity of 1,1-dimethyl-2-(4'-chlorophenyl)-ethylamine. Colourless crystals are obtained; M.P.$_K$=126–127° C.; Yield 72%.

EXAMPLE 12

4-(3'',4''-dimethoxyphenyl) - 1 - (3',4',5'-trimethoxyphenyl)-2-abazutene-1 (4885 CB).

The procedure described in Example 10 is repeated, but the 1,1-dimethyl-2-phenylethylenamine is replaced by an equimolecular quantity of 2-(3',4'-dimethoxyphenyl)ethylamine. The product does not crystallise. The solvent is evaporated and the residue is distilled from a retort under very low pressure. A thick yellow oil is obtained: B.P.$_{0.05\ mm.}$=225–235° C. Yield: 67%.

A number of the compounds described above were studied for their activity in producing anorexia and their action upon the central nervous system.

Anorexigenic activity

This investigation was carried out by the method of Spengler, the principle of which is as follows:

Twenty rats placed in individual cages have the possibility of feeding only during 7 hours out of every 24, the fixed hours being between 10 h. and 17 h. The feeding troughs are filled with a feeding powder and are covered with a special lid equipped with a central tube which enables the animals to reach their food without spilling any into the cage. Contamination of the food by urine or faeces is impossible owing to the dimensions of the feeding trough. By this method it is possible to weigh exactly the amount of food ingested at the end of a given time.

In order to prevent the condition of the animals from being impaired at each weekend an improvement has been made in Spengler's original technique.

On Friday evening a notched disc which is driven by an electric motor, which rotates once in 24 hours, is fitted to each cage; the opening of the troughs is only exposed at hours which correspond to the normal rhythm. Outside the days of the experiment only the quantity of food ingested by each rat during the 7 hours in which the rats have access to the feeding troughs is determined. During the days of the experiment the animals are treated one hour prior to presentation of the feeding troughs, and the quantity of food ingested is accurately determined one hour, two hours and seven hours after the animals have been given access to their food. The same determinations are carried out on control animals.

The results obtained are assembled in the form of a graph. On examining these results it is observed that all the compounds tested exert a marked effect in producing anorexia, and there are no marked differences between the activities of the different compounds at relatively high doses (100 and 50 mg./kg. orally) but the differences become more apparent at smaller doses. It was attempted to classify these compounds by determining the 50% effective dose, which is the dose at which the amount of food ingested during a given time is reduced by one-half of that ingested by the control animals.

It was also advantageous to take as percentage inhibition the value found 2 hours after administration of the product under test (i.e. 1 hour after presentation of the food).

It is generally at that moment that inhibition is greatest, but it may be objected that the value obtained does not take into account the duration of action of the product. Furthermore, it was found that it was more logical to consider the mean value of inhibition over a duration of 7 hours by taking the artithmetic means of the inhibitions at the end of 1 hour, 2 hours and 7 hours. It is from these mean values that the 50% effective doses for the different compounds studied were established, using the method of probits. Phentermine and chlorphentermine were used as comparison compounds.

The 50% effective doses ($ED_{50}$) of the different compounds chosen in the order of their decreasing anorexigenic activity are as follows:

$ED_{50}$ (in mg./kg., orally):
```
    4146 CB ------------------------------ 8
    Phentermine -------------------------- 11
    4377 CB ------------------------------ 14
    Chlorphentermine --------------------- 20
    4445 CB ------------------------------ 20
    4444 CB ------------------------------ 21
    4559 CB ------------------------------ 32
    4143 CB ------------------------------ 40
```

Other effects on the central nervous system

Apart from the anorexigenic property of the compound other, often undesirable effects, had also to be considered. Numerous anorexigenic substances have a stimulant effect, and amphetamine is of this type; this amine produces total anorexia at 7.5 mg./kg. administered orally, but at this dose it is a powerful stimulant and considerably increases the spontaneous motility of animals and, in particular, of the rat, the movements of which become markedly abnormal.

Other tests bring into evidence the central stimulant effect, for example, the anticataleptic activity with respect to prochlorperazine and the antireserpine effect and lastly the marked increase in aggressiveness.

The action of the different compounds on the spontaneous motility and their anticataleptic effect was studied systematically; for certain of these compounds the modifications in aggressiveness of the animals were studied by means of the combativity test in the rat.

(1) Spontaneous motility:

(a) In the rat.—The rats were placed in individual revolving drums and the number of turns was noted every hour for 4 hours 30 minutes and then at the end of 24 hours.

The results obtained are recorded in the following Table.

TABLE I.—EFFECT ON THE SPONTANEOUS MOTILITY OF THE RAT
[Results expressed in percent of the controls]

| Products | Doses administered in mg./kg., orally | | | | |
|---|---|---|---|---|---|
| | 10 | 25 | 10 | 100 | 200 |
| 4146 CB | +68 (s) | +94 (s) | +200 (s) | | |
| Phentermine | | | | 0 | +80 p 100/4h30 +115 p 100/24h |
| 4377 CB | | | | 0 | 0 |
| Chlorphentermine | | | +160 (ns) | | |
| 4445 CB | | 0 | +165 (ns) | | |
| 4444 CB | | +28 (ns) | +35 (ns) | | |
| 4559 CB | | | 0 | 0 | 0 |
| 4143 CB | | +59 (s) | +67 (s) | | | s=Statistically significant.
ns= not statistically significant.

This table shows that phentermine and compounds 4377 CB and 4559 CB have no effect on the spontaneous motility of the rat when administered orally in doses up to 100 and 200 mg./kg. bodyweight.

(b) Spontaneous activity (mice):

The animals are placed in cages with mobile floors for 30 minutes after administration of the test products, and the results are recorded for a 20 minutes stay in the cages. The following results (Table II) were found.

TABLE II.—EFFECT ON SPONTANEOUS MORTALITY IN THE MOUSE
[Results expressed in percent of the controls]

| Products | Doses administered in mg./kg., orally | | | |
|---|---|---|---|---|
| | 10 | 25 | 50 | 100 |
| 4146 CB | +56 (ns) | +153 (s) | +260 (s) | |
| Phentermine | | 0 | +98 (ns) | +160 (s) |
| 4377 CB | | +27 (ns) | 0 | 0 |
| Chlorphentermine | | | 0 | 0 |
| 4445 CB | | | 0 | 0 |
| 4444 CB | | 0 | 0 | +216 (s) |
| 4143 CB | | | 0 | +72 (ns) |

See footnotes at end of Table I.

This table shows that compounds 4377 CB and 4445 CB have no excitatory effect upon the mouse.

(2) Anticataleptic activity.—Prochlorperazine administered in a dose of 50 mg./kg. intraperitoneally induces in a mouse a cataleptic state from which the animal can be restored by means of certain central nervous stimulants such as, for example, amphetamine.

In all the tests, one group of mice treated with amphetamine in a dose of 10 mg./kg. intraperitoneally or orally was used as a control. The tests were made with one group of 10 animals for each dosage.

The results of the experiments are recorded in the following table (Table III).

TABLE III.—ANTICATALEPTIC ACTIVITY OF THE DIFFERENT COMPOUNDS
[Results expressed in percent of protected animals]

| Products | Intraperitoneally | | | | | | Orally | | |
|---|---|---|---|---|---|---|---|---|---|
| | 5 | 10 | 20 | 50 | 100 | 200 | 10 | 25 | 50 |
| 4146 CB | | | 30 | 50 | 60 | | | 20 | 45 |
| Amphetamine | | 100 | | | | | 60 | | |
| Phentermine | 50 | 70 | 80 | | | | | 20 | 60 |
| Amphetamine | | 80 | | | | | 37 | | |
| 4377 CB | | | 40 | 60 | | | 0 | 0 | 0 |
| Amphetamine | | 90 | | | | | 60 | | |
| Chlorphentermine | | | | | | | | 0 | 18 |
| Amphetamine | | | | | | | 36 | | |
| 4445 CB | | 5 | 30 | | | | | 0 | 0 |
| Amphetamine | | 90 | | | | | 40 | | |
| 4444 CB | | | | | | | | 20 | 65 |
| Amphetamine | | | | | | | 60 | | |
| 4143 CB | 0 | 0 | 0 | 0 | 0 | | | 0 | 0 |
| Amphetamine | | 100 | | | | | 70 | | |

In order to make a choice among the different compounds from the point of view of their practical use as anorexigenic substances, one must take into account not only this effect but must also investigate which of the compounds exerts the least excitatory effect on the central nervous system. Lastly, preferably that compound is selected which has the best therapeutic coefficient.

The effective anorexigenic dose on the one hand and the maximum doses which do not increase the spontaneous motility and those which have no anticataleptic effect are summarised in the form of a general table.

The coefficient $$\frac{50\% \text{ lethal dose}}{50\% \text{ effective dose}}$$

(therapeutic coefficient) and the coefficients $$\frac{\text{maximum dose to be ineffective on mobility}}{50\% \text{ effective dose}}$$

etc., enable one to determine the compound which appears to be the most advantageous for practical use.

TABLE IV.—RECAPITULATION OF THE MAIN ACTIVITIES AND RATIOS
[Activities expressed in mg./kg., orally]

| Products | 50% effective anorexigenic dose ($ED_{50}$) | 50% lethal dose | (1) $\frac{LD_{50}}{ED_{50}}$ | Maximum dose inactive on motility of the rat (MDIMR) | (2) $\frac{MDIMR}{ED_{50}}$ | Maximum dose inactive on motility of mouse (MDIMS) | (3) $\frac{MDIMS}{ED_{50}}$ | Maximum dose inactive on catalepsy (C) | (4) $\frac{C}{ED_{50}}$ |
|---|---|---|---|---|---|---|---|---|---|
| 4146 CB | 8 | 75 PO / 50 IP | 9.4 | <10 | <1.25 | <10 | <1.25 | <25 | <3.1 |
| Phentermine | 11 | 180 PO / 100 IP | 16.5 | >200 | >18 | <50 | <4.5 | <50 | <4.5 |
| 4377 CB | 14 | 255±23 PO / 800 IP | 18 | >200 | >14 | >100 | >7.1 | >50 | >3.6 |
| Chlorphentermine | 20 | 105±10 PO / 41±4 IP | 5.25 | <100 | <5 | >100 | >5 | <50 | <2.5 |
| 4445 CB | 20 | | | <100 | <5 | >100 | >5 | >50 | >2.5 |
| 4444 CB | 21 | | | <100 | <4.8 | <50 | <2.4 | <25 | <1.2 |
| 4143 CB | 40 | 105 PO / 150 IP | 3.8 | <100 | <2.5 | <100 | <2.5 | >50 | >1.25 |

These tests show that none of the compounds studied exerts an anticataleptic effect at the dosage at which it is active as an anorexia-producing drug when administered orally, but most of them nevertheless have a certain anticataleptic activity when administered intraperitoneally.

(3) Combativity test (rat).—Two aged male rats placed together in a cage in which the floor can be electrified by a current of known voltage become aggressive towards each other. It is easy to determine the voltage at which all the groups of rats are aggressive and then to see if under the influence of a central nervous stimulant the same rats are aggressive at a lower voltage. Some of the eight compounds studied slightly increase the aggressiveness. These are 4143 CB, 4445 CB, chlorphentermine and phentermine. The other compounds, on the other hand, have no effect at the doses at which they are anorexigenic.

(4) Acute toxicity.—The acute toxicity was studied on mice by classical procedures, using 10 or 20 animals per dose administered orally or intraperitoneally.

The $LD_{50}$ values are set out in Table IV.

Examination of the values indicated in Table IV shows that the therapeutic coefficient (1) of compound 4377 CB is very near to and, indeed, slightly higher than that of phentermine; it is markedly greater than that of the other compounds studied.

As regards the stimulant effects of these different compounds, they are less the higher the coefficients (2), (3) and (4) are; it will be noted that the compound 4146 CB which has a structure similar to that of benzedrine has low coefficients (2), (3) and (4); consequently, the difference between the anorexigenic dose and the central psycho-anileptic dose is small. On the other hand, the compound 4377 CB and phentermine have the highest coefficients (2), (3) and (4) and therefore have the least excitatory effect at the dosages at which they are anorexigenic.

Compound 4377 CB is particularly interesting because it is distinctly less toxic than phentermine and is highly anorexigenic at dosages which are very far removed from those which produce excitatory effects.

We claim:
1. 4 - (Chlorophenyl) - 1 - (3,4,5-trimethoxyphenyl)-3,3-dimethyl-2-aza-but-1-ene of the formula
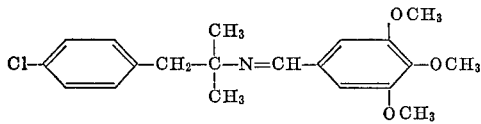
References Cited
UNITED STATES PATENTS
3,372,193  3/1968  Moffett _____ 260—566
FOREIGN PATENTS
906,331  9/1962  Great Britain _____ 260—566
BERNARD HELFIN, Primary Examiner
G. A. SCHWARTZ, Assistant Examiner
U.S. Cl. X.R.
260—999